(12) United States Patent
Morigaki et al.

(10) Patent No.: US 6,670,075 B2
(45) Date of Patent: Dec. 30, 2003

(54) LITHIUM POLYMER SECONDARY CELL

(75) Inventors: Kenichi Morigaki, Nishinomiya (JP); Kazuhiro Watanabe, Katano (JP); Norishige Nanai, Hirakata (JP); Masaya Ugaji, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 200 days.

(21) Appl. No.: 10/019,932

(22) PCT Filed: May 9, 2001

(86) PCT No.: PCT/JP01/03882
§ 371 (c)(1),
(2), (4) Date: Jan. 7, 2002

(87) PCT Pub. No.: WO01/86747
PCT Pub. Date: Nov. 15, 2001

(65) Prior Publication Data
US 2003/0027045 A1 Feb. 6, 2003

(30) Foreign Application Priority Data
May 12, 2000 (JP) ........................................ 2000-139968

(51) Int. Cl.$^7$ ................................................ H01M 4/62
(52) U.S. Cl. ...................... 429/217; 429/212; 429/300; 429/303; 429/304
(58) Field of Search ................................ 429/212, 217, 429/300, 303, 304

(56) References Cited

U.S. PATENT DOCUMENTS 5,296,318 A    3/1994  Gozdz et al.
5,952,126 A    9/1999  Lee et al.
6,090,504 A *  7/2000  Sung et al.
6,579,649 B2 * 6/2003  Tsutsue et al.

FOREIGN PATENT DOCUMENTS

| EP | 0822608 A2 | 2/1998 |
| EP | 938150 A2 | 8/1999 |
| EP | 1001477 A1 | 5/2000 |
| JP | 55-35420 | 3/1980 |
| JP | 3-171567 | 7/1991 |
| JP | 4-306560 | 10/1992 |
| JP | 2001-68158 | 3/2001 |

* cited by examiner

Primary Examiner—Carol Chaney
Assistant Examiner—Dah-Wei D. Yuan
(74) Attorney, Agent, or Firm—McDermott, Will & Emery

(57) ABSTRACT

In a lithium polymer secondary battery comprising: a positive electrode comprising a lithium-containing complex oxide; a negative electrode comprising a material capable of intercalating and deintercalating lithium ions; and a separator interposed between the positive electrode and the negative electrode, the weight $W_p$ of the polymer material constituting the polymer electrolyte contained in the positive electrode, the weight $W_n$ of the polymer material constituting the polymer electrolyte contained in the negative electrode, and the weight $W_s$ of the polymer material constituting the polymer electrolyte contained in the separator satisfy all of the following: $W_s < W_n < W_p$, $20 \leq 100W_p/(W_p+W_n+W_s) \leq 50$, $20 \leq 100W_n/(W_p+W_n+W_s) \leq 50$, and $20 \leq 100W_s/(W_p+W_n+W_s) \leq 50$; so that a lithium polymer secondary battery which is excellent in cycle stability and high in reliability is provided.

5 Claims, 1 Drawing Sheet

LITHIUM POLYMER SECONDARY CELL

TECHNICAL FIELD

The present invention relates to a lithium polymer secondary battery comprising: a positive electrode comprising a lithium-containing complex oxide; a negative electrode comprising a material capable of intercalating and deintercalating lithium ions; and a separator interposed between the positive electrode and the negative electrode; wherein the respective positive electrode, the negative electrode and the separator contain a polymer electrolyte.

BACKGROUND ART

Lithium ion secondary batteries which use a lithium-containing complex oxide as a positive electrode material, a carbon material as a negative electrode material, and which contain a liquid non-aqueous electrolyte have a high voltage, a high energy density and an excellent low temperature characteristic as compared with aqueous solution type secondary batteries. Further, lithium ion secondary batteries are excellent in cycle life and safety because they use no metallic lithium in the negative electrode, and therefore they have rapidly been put into practical use.

In recent years, in order to meet the demand for thinner and lighter-weight batteries than conventional ones, lithium polymer batteries containing a polymer electrolyte in which a liquid non-aqueous electrolyte is retained in a polymer material have been developed.

However, lithium polymer secondary batteries containing a gel-like polymer electrolyte have a problem of being inferior in the cycle stability as compared with lithium ion secondary batteries containing a liquid non-aqueous electrolyte.

For example, when a lithium polymer secondary battery is charged and discharged at room temperature at 1C. (one hour rate), the capacity at the 100th cycle happens to be decreased to around 80% of the initial capacity. This decrease is larger than that of a lithium ion secondary battery.

On the other hand, as a polymer material constituting a polymer electrolyte, for example, materials described in the following have been proposed.

In Japanese Laid-Open Patent Publication No. Hei 3-171567, an ethylene oxide type polymer which has an excellent solubility with a non-aqueous electrolyte has been disclosed. However, the ethylene oxide type polymer has a problem in the thermal stability because it causes sol/gel transition at high temperatures.

In Japanese Laid-Open Patent Publication No. Hei 4-306560, a polyacrylonitrile type material which is flame-retardant and which exhibits a high ionic conductivity is disclosed. However, limited numbers of non-aqueous solvents are soluble with the polyacrylonitrile type material; there is also a problem of the thermal stability in a resultant gel.

In U.S. Pat. No. 5,296,318, a vinylidene fluoride type polymer which is electrochemically stable and excellent in the flame-retardancy. However, the vinylidene fluoride type polymer has a problem of having a low affinity with a non-aqueous solvent at high temperatures.

In Japanese Laid-Open Patent Publication No. Sho 55-35420, a polyacrylate type material which is excellent in retaining a non-aqueous solvent. However, the polyacrylate type material is considered to be electrochemically unstable.

In each of the materials, improvements in view of the respective problems have been proposed; however, remarkable improvements have not been achieved yet.

DISCLOSURE OF INVENTION

The present invention improves the cycle stability in the lithium polymer secondary battery by optimizing the distribution of the polymer material contained in the positive electrode, the negative electrode and the separator.

Specifically, the present invention relates to a lithium polymer secondary battery comprising: a positive electrode comprising a lithium-containing complex oxide; a negative electrode comprising a material capable of intercalating and deintercalating lithium ions; and a separator interposed between the positive electrode and the negative electrode;

wherein the positive electrode, the negative electrode and the separator contain a polymer electrolyte comprising a polymer material, a non-aqueous solvent and a solute;

and wherein, the weight $W_p$ of the polymer material contained in the positive electrode, the weight $W_n$ of the polymer material contained in the negative electrode, and the weight $W_s$ of the polymer material contained in the separator, satisfy all of the following:

$$W_s < W_n < W_p \tag{1}$$

$$20 \leq 100 W_p/(W_p+W_n+W_s) \leq 50 \tag{2}$$

$$20 \leq 100 W_n/(W_p+W_n+W_s) \leq 50 \tag{3}$$

$$20 \leq 100 W_s/(W_p+W_n+W_s) \leq 50 \tag{4}$$

In the negative electrode, the material capable of intercalating and deintercalating lithium ions preferably comprises at least one selected from the group consisting of a carbon material, an alloy, an oxide and a nitride.

The above polymer material preferably comprises a polymer comprising at least one of an acrylate unit and a methacrylate unit as well as an alkylene oxide unit, a polyurethane having a carbonate group or a polymer comprising a vinylidene fluoride unit. These may be used singly or in combination of two or more kinds.

The polymer electrolyte contained in the positive electrode, the negative electrode and the separator preferably comprises the same or similar polymer material. For example, when a copolymer of vinylidene fluoride and hexafluoropropylene is used as the polymer material, the respective positive electrode, negative electrode and separator preferably contain the copolymer of vinylidene fluoride and hexafluoropropylene or a polymer having a very similar structure thereto.

Hereinafter, the polymer material refers to the polymer material constituting the polymer electrolyte, and it is distinguished with a material having other functions. However, the polymer material constituting the polymer electrolyte and also serving as a binder for the active material at the same time is treated as the polymer material constituting the polymer electrolyte.

BEST MODE FOR CARRYING OUT THE INVENTION

Figure 1:
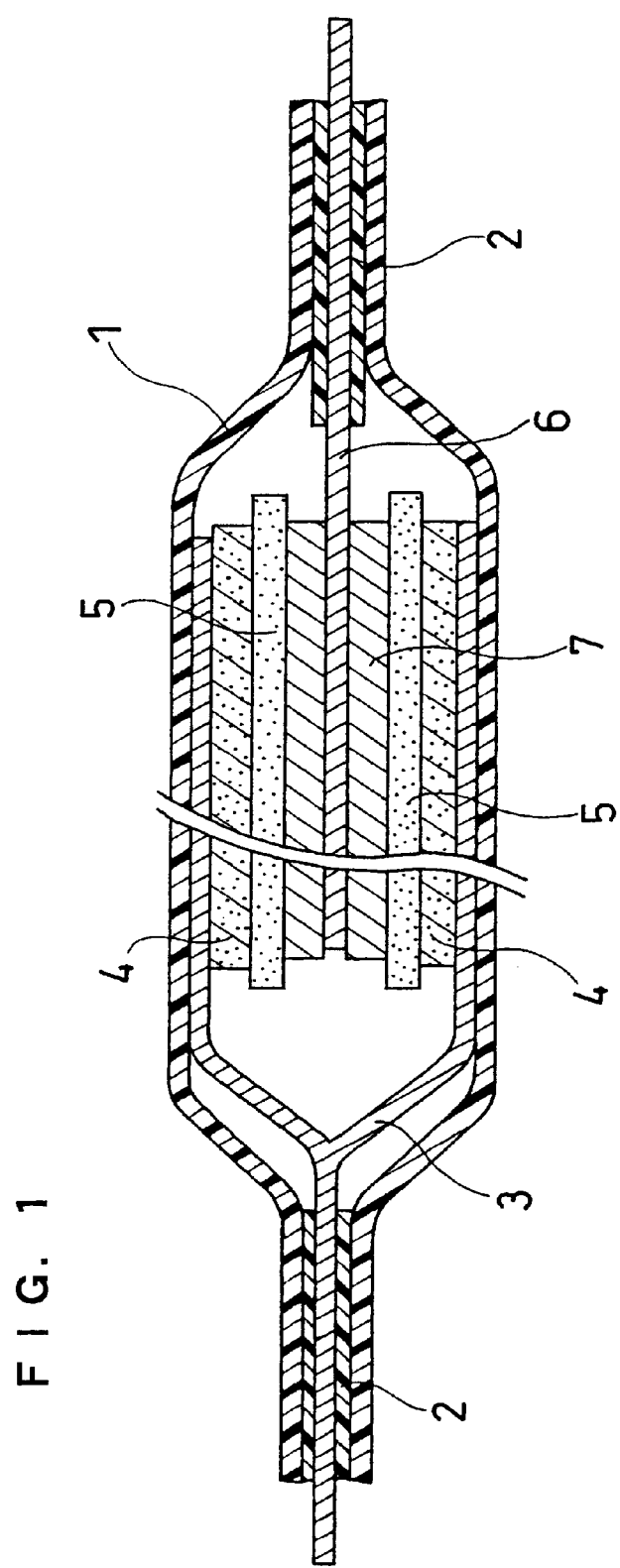
FIG. 1 is a longitudinal cross sectional view of one example of the lithium polymer secondary battery of the present invention.

Conventional lithium ion secondary batteries contain no polymer material which is soluble with non-aqueous solvents. For example, as the material for a binder contained in the positive electrode and the negative electrode or a separator of lithium ion secondary batteries, polymer materials which do not dissolve or swell in non-aqueous solvents are used. Accordingly, the distribution of the liquid non-aqueous electrolyte is not influenced by these materials.

However, in lithium polymer secondary batteries, since a polymer material constituting a polymer electrolyte has a high affinity with a non-aqueous solvent, the distribution of a non-aqueous electrolyte comprising the non-aqueous solvent and a solute is influenced by the distribution of the polymer material. Accordingly, since the polymer material swells by absorbing the non-aqueous electrolyte, if too much polymer material is distributed in a specific battery element, the non-aqueous electrolyte concentrates in this element. As a result, other elements locally run out of the non-aqueous solvent, which hinders the charge/discharge reaction. There is also a problem that, if the electrode swells too much with the non-aqueous solvent, the electrically conductive network in the electrode is broken to liberate the active material particles, which results in a decrease in the battery capacity.

It is known that, when graphite, for example, is used as the negative electrode material, the electrode plate expands and contracts along with the charge/discharge reaction. In order to ease this change in the volume of the electrode plate due to the negative electrode material, it is effective to allow the negative electrode to contain a certain amount of polymer material. However, there arises a problem that, since the polymer material constituting the polymer electrolyte swells with the non-aqueous solvent, the expansion of the electrode plate is accelerated to deteriorate the cycle characteristics of the battery.

In order to avoid this problem, it is effective to prevent the non-aqueous electrolyte from concentrating in the negative electrode by optimizing the amount of the polymer material contained in the positive electrode and the separator. In this case, it is considered that the change in the volume of the electrode plate is uniformed and the cycle characteristics are improved, and thus a lithium polymer secondary battery having a high reliability can be achieved.

Accordingly, in the lithium polymer secondary battery of the present invention, it is controlled so that the weight $Wp$ of the polymer material constituting the polymer electrolyte contained in the positive electrode, the weight $Wn$ of the polymer material constituting the polymer electrolyte contained in the negative electrode, and the weight $Ws$ of the polymer material constituting the polymer electrolyte contained in the separator satisfy all of the following:

$$Ws < Wn < Wp \quad (1)$$

$$20 \leq 100 Wp/(Wp+Wn+Ws) \leq 50 \quad (2)$$

$$20 \leq 100 Wn/(Wp+Wn+Ws) \leq 50 \quad (3)$$

$$20 \leq 100 Ws/(Wp+Wn+Ws) \leq 50 \quad (4)$$

By satisfying all of the above conditions (1) to (4), the distribution of the polymer material constituting the polymer electrolyte in the battery is optimized, the localization of the non-aqueous electrolyte is suppressed and the cycle characteristics of the lithium polymer secondary battery are improved.

The effect of uniforming the distribution of the non-aqueous electrolyte in the battery is further enforced when each of the weight proportion of the polymer material constituting the polymer electrolyte contained in each of the positive electrode, negative electrode and separator per the weight of the polymer material constituting all the polymer electrolyte contained in the positive electrode, negative electrode and separator is controlled respectively to 20 to 45 wt %.

In the following, the lithium polymer secondary battery of the present invention will be described with reference to the drawing.

FIG. 1 is a longitudinal cross sectional view of one example of a flat type lithium polymer secondary battery. This battery comprises a stack of electrode plate group and a flat battery case 1. For a battery case 1, a laminate film composed of resin films with an aluminum foil interposed therebetween is generally used. The opening of the battery case 1 is sealed with a resin 2 for adhesion. As the resin 2, a heat-fusion thermoplastic resin or a thermosetting resin is preferably used. In the battery case 1, housed is an electrode plate group comprising a positive electrode plate composed of a positive electrode current collector 3 and positive electrode active material layer 4 formed on one side thereof, separator layers 5 containing an inorganic filler, and a negative electrode plate composed of a negative electrode current collector 6 and negative electrode active material layers 7 formed on both sides thereof. Leads are formed on the respective current collectors, and are guided, being insulated from each other, to the outside from the opening of the battery case 1 via the resin 2. Aluminum and copper are preferably used in the positive electrode current collector 3 and the negative electrode current collector 6, respectively.

As the positive electrode material contained in the positive electrode active material layers 4, for example, a lithium-containing complex oxide is used. Among the lithium-containing complex oxides, a lithium-cobalt complex oxide is preferably used.

On the other hand, as the negative electrode material contained in the negative electrode active material layers 7, a carbon material, an alloy, an oxide, a nitride and the like capable of intercalating and deintercalating lithium ions are used. Among these, spherical graphite is preferably used.

As the inorganic filler contained in the separator layers 5, for example, a fine powder of silicon dioxide is used.

However, in the present invention, it is important to uniform the distribution of the non-aqueous electrolyte and there is no restriction as to the kinds of the positive electrode material, the negative electrode material and the separator material.

All of the positive electrode active material layers 4, the negative electrode active material layers 7 and the separator layers 5 contain the polymer electrolyte.

There is no specific limitation as to the kind of the polymer material constituting the polymer electrolyte; for example, a polymer comprising at least one of an acrylate unit and a methacrylate unit as well as an alkylene oxide unit, a polyurethane having a carbonate group and a polymer comprising a vinylidene fluoride unit are preferable.

As the polymer comprising at least one of an acrylate unit and a methacrylate unit as well as an alkylene oxide unit, there can be mentioned, for example, a polymer having, as the main chain, polyethylene oxide, polypropylene oxide or a blocked copolymer of these, and having an acrylate group or a methacrylate group at the ends thereof.

As the polyurethane having a carbonate group, there can be mentioned, for example, a reaction product of a polyol having a carbonate group with an aliphatic diisocyanate.

As the polymer comprising a vinylidene fluoride unit, there can be mentioned, for example, a copolymer of vinylidene fluoride and hexafluoropropylene.

Hereinafter, a method is described as a preferable embodiment for producing an electrode plate group comprising a positive electrode plate, a negative electrode plate and separator layers which contain as the polymer material a dimethacrylate comprising a polyalkylene oxide as the main chain. Herein, the case of using a dimethacrylate having an average molecular weight of 800 to 2,000, preferably 1,000 to 1,600 is described.

A dimethacrylate comprising a polyalkylene oxide as the main chain is dissolved in N-methyl-2-pyrrolidone (hereinafter referred to as NMP) to make a solution. In this solution, for example, a lithium-cobalt complex oxide as a positive electrode material and acetylene black as a electrically conductive agent are dispersed to make a positive electrode paste. To this positive electrode paste, about 0.5% by weight of a thermal polymerization initiator per the weight of the dimethacrylate is added. As the thermal polymerization initiator, 2,2'-azobisisobutylonitril (hereinafter referred to as AIBN) is preferably used. This paste is applied, for example, onto one surface of an aluminum foil and heated to polymerize the dimethacrylate and to remove NMP. Then, the resulting electrode plate is cut to a prescribed size to produce a positive electrode plate.

On the other hand, in NMP solution of the dimethacrylate comprising a polyalkylene oxide as the main chain, for example, spherical graphite as a negative electrode material is dispersed to make a negative electrode paste. To this negative electrode paste, a thermal polymerization initiator is added in the same manner as described above. This paste is applied, for example, onto both surfaces of a copper foil, heated to polymerize the dimethacrylate and to remove NMP. Then, the resulting electrode plate is cut to a prescribed size to produce a negative electrode plate.

After leads are formed to the respective resulting positive electrode plate and the negative electrode plate, a liquid non-aqueous electrolyte comprising a non-aqueous solvent and a solute is impregnated into each electrode plate by vacuum impregnation.

There is no specific restriction as to the kinds of the non-aqueous solvent and the solute: as the non-aqueous solvent, for example, ethylene carbonate, propylene carbonate, butylene carbonate, dimethyl carbonate, diethyl carbonate, ethyl methyl carbonate are used. These can be used preferably in combination of two or more kinds. As the solute, for example, $LiPF_6$, $LiBF_4$ and the like are used.

On the positive electrode plate containing the non-aqueous electrolyte, a paste for the separator layer is applied. As the paste for the separator layer, used is, for example, a mixture of the dimethacrylate comprising a polyalkylene oxide as the main chain, a liquid non-aqueous electrolyte comprising a non-aqueous solvent and a solute, a fine powder of silicon dioxide provided with hydrophobicity, and about 1% by weight of the thermal polymerization initiator per the weight of the dimethacrylate. The paste on the positive electrode plate is transformed into a gel by heating to form a separator layer. Then, the negative electrode plate is sandwiched by the positive electrode plates with the separator layers disposed inside, thereby to produce an electrode plate group.

The resulting electrode plate group is inserted into a battery case and the opening of the case is sealed to give a lithium polymer secondary battery. In order to enforce the adhesion of the negative electrode plate with the separator layers, it is possible to apply thinly the paste for the separator layer onto the surfaces of the negative electrode plate and to heat after housing the electrode plate group in the battery case.

In the above, description has been made about a flat type battery using a laminated type electrode plate group; however, the present invention is applicable to batteries in general containing the polymer electrolyte. For example, the present invention is also applicable to a battery using a folded type or rolled-up type electrode plate group.

Next, the present invention will be described in detail with reference to examples.

EXAMPLE 1

Using lithium-cobalt complex oxide ($LiCoO_2$) as the positive electrode active material and spherical graphite as the negative electrode active material, a flat type lithium polymer secondary battery as shown in FIG. 1 was produced.

The positive electrode was produced in the following manner.

A positive electrode paste was prepared by mixing $LiCoO_2$ and acetylene black as the electrically conductive agent at a ratio by weight of 90:10, and dispersing the mixture in NMP solution containing a dimethacrylate comprising a polyalkylene oxide as the main chain at a prescribed concentration.

As the dimethacrylate comprising a polyalkylene oxide as the main chain, used was a dimethacrylate having an average molecular weight of 1,500 and represented by the general formula:

$$CH_2=C(CH_3)-COO-(CH_2CH_2O)_n-CO-C(CH_3)=CH_2$$

To the positive electrode paste, 0.5% by weight of AIBN per the weight of the dimethacrylate was added. This paste was applied onto one surface of an aluminum foil, heated at 80° C. to polymerize the dimethacrylate and remove the solvent, thereby to produce a positive electrode plate.

The negative electrode was produced in the following manner.

A negative electrode paste was prepared by dispersing a spherical graphite powder in NMP solution containing the above-mentioned dimethacrylate comprising a polyalkylene oxide as the main chain at a prescribed concentration. To the negative electrode paste as well, 0.5% by weight of AIBN per the weight of the dimethacrylate was added. This paste was applied onto both surfaces of a copper foil, heated at 80° C. to polymerize the dimethacrylate and remove the solvent, thereby to produce a negative electrode plate.

A lead was connected to each of the positive electrode plate and the negative electrode plate.

Next, a non-aqueous electrolyte was prepared by dissolving $LiPF_6$ as a solute at 1.5 mol/dm$^3$ in a mixed solvent of ethylene carbonate and diethyl carbonate at a volume ratio of 1:3. Then, this non-aqueous electrolyte was impregnated into the positive electrode plate and the negative electrode plate by vacuum impregnation.

A paste for the separator layer was prepared by dissolving the above-mentioned dimethacrylate comprising a polyalkylene oxide as the main chain in the above non-aqueous electrolyte at a prescribed ratio and adding 1% by weight of AIBN per the weight of the dimethacrylate.

A separator layer was formed by applying a prescribed amount of the paste for the separator layer onto one surface of the positive electrode plate containing the non-aqueous electrolyte, and heating the paste on the positive electrode plate to be transformed into a gel. Then, after the paste for the separator layer was thinly applied to both surfaces of the negative electrode plate containing the electrolyte, an electrode plate group was formed by sandwiching the negative electrode plate with the positive electrode plates having the separator layers disposed inside thereof. The electrode plate group was inserted into a battery case of a laminate film made of resin films with an aluminum foil disposed therebetween, and the opening thereof was sealed with a resin. Then, the battery was heated at 100° C. to strengthen the adhesion of the negative electrode and the separator layer.

The ratio by weight of the dimethacrylate in the respective positive electrode plate, negative electrode plate and separator layers determined by the composition and weight of the solid matters was: 40% by weight in the positive electrode, 35% by weight in the negative electrode and 25% by weight in the separator layers.

EXAMPLE 2

A lithium polymer secondary battery was produced in the same manner as in Example 1 except that a dimethacrylate comprising a polyalkylene oxide as the main chain and a trimethacrylate comprising polyalkylene oxides as the main chains were contained in the negative electrode paste at a ratio by weight of 3:1, and the ratio by weight of the methacrylates in each battery constituting element was changed. The ratio by weight of the methacrylates was: 50% by weight in the positive electrode, 30% by weight in the negative electrode and 20% by weight in the separator layers.

As the trimethacrylate comprising polyalkylene oxides as the main chains, used was a trimethacrylate having an average molecular weight of 1,200 and represented by the general formula:

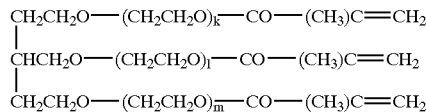

EXAMPLE 3

A battery was produced in the same manner as in Example 1 except that the ratio by weight of the dimethacrylate in each battery constituting element was changed. The ratio by weight of the dimethacrylate was: 42% by weight in the positive electrode, 37% by weight in the negative electrode and 21% by weight in the separator layers.

EXAMPLE 4

A battery was produced in the same manner as in Example 1 except that the ratio by weight of the dimethacrylate in each battery constituting element was changed. The ratio by weight of the dimethacrylate was: 45% by weight in the positive electrode, 30% by weight in the negative electrode and 25% by weight in the separator layers.

EXAMPLE 5

A battery was produced in the same manner as in Example 1 except that the ratio by weight of the dimethacrylate in each battery constituting element was changed. The ratio by weight of the dimethacrylate was: 37% by weight in the positive electrode, 35% by weight in the negative electrode and 28% by weight in the separator layers.

EXAMPLE 6

A battery was produced almost in the same manner as in Example 1 except that the dimethacrylate comprising a polyalkylene oxide as the main chain was replaced by an urethane polymer, which is a reaction product of a prescribed carbonate diol with hexamethylene diisocyanate. The ratio by weight of the urethane polymer was: 40% by weight in the positive electrode, 35% by weight in the negative electrode and 25% by weight in the separator layers.

As the carbonate diol, used was one having an average molecular weight of 1,000 and represented by the general formula:

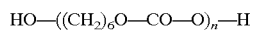

Herein, the carbonate diol and hexamethylene diisocyanate contained in the positive electrode paste, negative electrode paste and paste for the separator layers react when they are heated at 80 to 100° C. in each predetermined process to form an urethane bond. As a result, the urethane polymer having a crosslinked structure was formed. This case does not need a polymerization initiator.

EXAMPLE 7

A battery was produced almost in the same manner as in Example 1 except that the dimethyacrylate comprising a polyalkylene oxide as the main chain was replaced by a copolymer of vinylidene fluoride and hexafluoropropylene. In this example, no polymerization initiator was needed.

However, dibutyl phthalate (hereinafter referred to as DBP) as a plasticizer was added to the positive electrode paste, the negative electrode paste and the paste for the separator layers. The appropriate amount of DBP is in the range of 10 to 500 parts by weight per 100 parts by weight of the copolymer of vinylidene fluoride and hexafluoropropylene.

The paste for the separator layers was applied onto a film of polyethylene terephthalate, dried and cut to form separators. Then, the resultant separators were allowed to sandwich the negative electrode plate and joined thereto by heating and pressing. Next, the negative electrode plate with the separators disposed on both surfaces thereof was sandwiched by the positive electrode plates, heated and pressed to give an electrode plate group. Then, DBP contained in the electrode plate group was extracted with diethyl ether, and the electrode plate group was dried and inserted in a battery case. A non-aqueous electrolyte was poured into the battery case under vacuum, then, the opening of the case was sealed to complete a battery.

The non-aqueous electrolyte used herein was prepared by dissolving $LiPF_6$ as the solute at 1.5 $mol/dm^3$ in a mixed solvent containing ethylene carbonate and ethyl methyl carbonate at a ratio by volume of 1:3.

The ratio by weight of the copolymer of vinylidene fluoride and hexafluoropropylene in the battery was: 43% by weight in the positive electrode, 36% by weight in the negative electrode and 21% by weight in the separator layers.

Comparative Example 1

A battery was produced in the same manner as in Example 1 except that the ratio by weight of the dimethacrylate in each battery constituting element was changed. The ratio by weight of the dimethacrylate was: 15% by weight in the positive electrode, 55% by weight in the negative electrode and 30% by weight in the separator layers.

Comparative Example 2

A battery was produced in the same manner as in Example 1 except that the ratio by weight of the dimethacrylate in each battery constituting element was changed. The ratio by weight of the dimethacrylate was: 55% by weight in the positive electrode, 15% by weight in the negative electrode and 30% by weight in the separator layers.

Comparative Example 3

A battery was produced in the same manner as in Example 6 except that the ratio by weight of the urethane polymer in each battery constituting element was changed. The ratio by weight of the urethane polymer was: 45% by weight in the positive electrode, 40% by weight in the negative electrode and 15% by weight in the separator layers.

Comparative Example 4

A battery was produced in the same manner as in Example 7 except that the ratio by weight of the copolymer of vinylidene fluoride and hexapluoropropylene in each battery constituting element was changed. The ratio by weight of the copolymer of vinylidene fluoride and hexafluoropropylene was: 20% by weight in the positive electrode, 25% by weight in the negative electrode and 55% by weight in the separator layers.

The batteries obtained in Examples 1 to 7 and Comparative Examples 1 to 4 were subjected to charge and discharge cycle at a constant current under the condition of 20° C., a charge terminate voltage of 4.2 V, a discharge terminate voltage of 3.0 V and 1 hour rate. The capacity maintenance rate of each battery after 100 cycles was determined. The results are shown in Table 1.

TABLE 1

| | Weight ratio of polymer material (% by weight) | | | Kind of polymer material | Capacity maintenance rate (%) |
|---|---|---|---|---|---|
| | Positive electrode | Negative electrode | Separator layer | | |
| Ex. 1 | 40 | 35 | 25 | methacrylate | 91 |
| Ex. 2 | 50 | 30 | 20 | methacrylate | 86 |
| Ex. 3 | 42 | 37 | 21 | methacrylate | 88 |
| Ex. 4 | 45 | 30 | 25 | methacrylate | 87 |
| Ex. 5 | 37 | 35 | 28 | methacrylate | 86 |
| Ex. 6 | 40 | 35 | 25 | urethane | 87 |
| Ex. 7 | 43 | 36 | 21 | vinylidene fluoride | 92 |
| Com. Ex. 1 | 15 | 55 | 30 | methacrylate | 76 |
| Com. Ex. 2 | 55 | 15 | 30 | methacrylate | 70 |
| Com. Ex. 3 | 45 | 40 | 15 | urethane | 68 |
| Com. Ex. 4 | 20 | 25 | 55 | vinylidene fluoride | 80 |

As apparent from Table 1, all the batteries in Examples show a capacity maintenance rate of 85% or higher independent of the kind of the polymer material. From this, it is found that the cycle stability of the battery is improved by making the weight ratio of the polymer material constituting the polymer electrolyte in the battery greater in the order of: the positive electrode>the negative electrode>the separator layer, as well as making the amount of the polymer material in the positive electrode, the negative electrode and the separator layer in a range of 20 to 50% by weight of the total amount. This is presumably because: the distribution of the polymer electrolyte in the battery was uniformed. Also, from the results of Table 1, it is found that the difference between $100W_p/(W_p+W_n+W_s)$ and $100 W_n/(W_p+W_n+W_s)$ is particularly preferably 5 to 7% by weight.

In Examples, $LiCoO_2$ as the positive electrode material and spherical graphite as the negative electrode material were used; however, it is considered that similar effects can be obtained using other materials as the positive electrode and negative electrode materials. For example, as the positive electrode material, $LiNiO_2$, $LiMn_2O_4$, $LiMnO_2$, $LiV_3O_8$ and the like can be used singly or in combination. As the negative electrode material, carbon materials such as natural graphite, artificial graphite and a graphitized carbon fiber, alloys or oxides comprising Si, Sn, Al, B, Ge, P. Pb or the like, and nitrides such as $Li_3N$ and $Li_{3-x}Co_xN$ can be used.

Industrial Applicability

As described above, by controlling the ratio by weight of the polymer material in the battery at a predetermined ratio, it is possible to prevent the localization of the polymer electrolyte in the battery, allowing it to distribute uniformly, thereby suppressing ununiform changes in the volume of the electrodes during charge and discharge cycle As a result, a lithium polymer secondary battery which is excellent in the cycle stability and high in reliability can be provided.

What is claimed is:

1. A lithium polymer secondary battery comprising: a positive electrode comprising a lithium-containing complex oxide; a negative electrode comprising a material capable of intercalating and deintercalating lithium ions; and a separator interposed between said positive electrode and said negative electrode;

wherein said positive electrode, said negative electrode and said separator contain a polymer electrolyte comprising a polymer material, a non-aqueous solvent and a solute, and wherein the weight Wp of the polymer material contained in said positive electrode, the weight Wn of the polymer material contained in said negative electrode and the weight Ws of the polymer material contained in said separator satisfy all of the following:

$$W_s < W_n < W_p \tag{1}$$

$$20 \leq 100 W_p/(W_p+W_n+W_s) \leq 50 \tag{2}$$

$$20 \leq 100 W_n/(W_p+W_n+W_s) \leq 50 \tag{3}$$

$$20 \leq 100 W_s/(W_p+W_n+W_s) \leq 50 \tag{4}.$$

2. The lithium polymer secondary battery in accordance with claim 1, wherein said material capable of intercalating and deintercalating lithium ions comprises at least one selected from the group consisting of a carbon material, an alloy, an oxide and a nitride.

3. The lithium polymer secondary battery in accordance with claim 1, wherein said polymer material comprises an alkylene oxide unit and at least one of an acrylate unit and a methacrylate unit.

4. The lithium polymer secondary battery in accordance with claim 1, wherein said polymer material comprises a polyurethane having a carbonate group.

5. The lithium polymer secondary battery in accordance with claim 1, wherein said polymer material comprises a vinylidene fluoride unit.

* * * * *